United States Patent
Goncharov et al.

(10) Patent No.: US 10,706,877 B2
(45) Date of Patent: Jul. 7, 2020

(54) SPIN TORQUE LAYER IN SIDE GAP FOR IMPROVED FIELD AND CROSS TRACK FIELD GRADIENT

(71) Applicant: Western Digital Technologies, Inc., San Jose, CA (US)

(72) Inventors: Alexander Goncharov, Morgan Hill, CA (US); Muhammad Asif Bashir, San Jose, CA (US); James Terrence Olson, San Jose, CA (US); Petrus Antonius Van Der Heijden, Cupertino, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/276,480

(22) Filed: Feb. 14, 2019

(65) Prior Publication Data
US 2019/0244634 A1  Aug. 8, 2019

Related U.S. Application Data

(63) Continuation of application No. 16/017,896, filed on Jun. 25, 2018, now abandoned.
(Continued)

(51) Int. Cl.
*G11B 5/31* (2006.01)
*G11B 5/23* (2006.01)
(Continued)

(52) U.S. Cl.
CPC .............. *G11B 5/3146* (2013.01); *G11B 5/11* (2013.01); *G11B 5/1278* (2013.01); *G11B 5/23* (2013.01);
(Continued)

(58) Field of Classification Search
None
See application file for complete search history.

(56) References Cited

U.S. PATENT DOCUMENTS

| 7,872,835 B2 | 1/2011 | Guan |
| 8,238,059 B1 | 8/2012 | Tang et al. |
(Continued)

FOREIGN PATENT DOCUMENTS

| CN | 104835510 B | 11/2017 |
| JP | 2013251042 A | 12/2013 |
| WO | 2015126326 A1 | 8/2015 |

OTHER PUBLICATIONS

Bai et al. "High Density Perpendicular Recording With Wrap-Around Shielded Writer," IEEE Transactions on Magnetics, vol. 46, No. 3, Mar. 2010, pp. 722-729.
(Continued)

*Primary Examiner* — Craig A. Renner
(74) *Attorney, Agent, or Firm* — Patterson & Sheridan, LLP; Steven Versteeg (57) ABSTRACT

A magnetic recording head is disclosed having a main pole, a shield hot seed layer positioned at a first side of the main pole, a first material positioned at both a second side and a third side of the main pole, the first material connected to the main pole, a second material positioned adjacent to the first material on the second side and the third side of the main pole, the second material comprised of a spin torque layer, a third material positioned adjacent to the second material on the second side and the third side of the main pole, a fourth material positioned adjacent to the third material on the second side and the third side of the main pole and a side shield connected on an exterior side of the fourth material.

20 Claims, 7 Drawing Sheets

Related U.S. Application Data (60) Provisional application No. 62/570,030, filed on Oct. 9, 2017.

(51) Int. Cl.
  *G11B 5/235* (2006.01)
  *G11B 5/11* (2006.01)
  *G11B 5/127* (2006.01)
  *G11B 5/00* (2006.01)

(52) U.S. Cl.
  CPC ............. *G11B 5/235* (2013.01); *G11B 5/315* (2013.01); *G11B 2005/0024* (2013.01)

(56) References Cited

U.S. PATENT DOCUMENTS

| | | |
|---|---|---|
| 8,341,826 B1 | 1/2013 | Jiang et al. |
| 8,564,903 B2 | 10/2013 | Min et al. |
| 8,582,240 B1 | 11/2013 | Chen et al. |
| 8,705,206 B1 | 4/2014 | Maeda et al. |
| 8,724,259 B1 | 5/2014 | Liu et al. |
| 8,964,332 B1 | 2/2015 | Katada et al. |
| 9,076,466 B2 | 7/2015 | Urakami et al. |
| 9,230,571 B1 | 1/2016 | Chen et al. |
| 9,275,672 B2 | 3/2016 | Shiroishi et al. |
| 9,286,919 B1 | 3/2016 | Liu et al. |
| 9,299,367 B1 | 3/2016 | Tang et al. |
| 9,368,135 B2 | 6/2016 | Gao |
| 9,406,316 B2 | 8/2016 | Urakami et al. |
| 9,881,637 B1 | 1/2018 | Wilson et al. |
| 10,014,012 B1* | 7/2018 | Song et al. ............ G11B 5/315 |
| 10,121,497 B1 | 11/2018 | Takahashi et al. |
| 10,186,284 B2 | 1/2019 | Narita et al. |
| 10,210,888 B1* | 2/2019 | Li et al. ................. G11B 5/314 |
| 10,236,021 B2 | 3/2019 | Narita et al. |
| 10,276,193 B2 | 4/2019 | Narita et al. |
| 10,325,618 B1 | 6/2019 | Wu et al. |
| 10,366,714 B1 | 7/2019 | Olson et al. |
| 2008/0304176 A1 | 12/2008 | Takagishi et al. |
| 2009/0059423 A1 | 3/2009 | Yamada et al. |
| 2009/0080120 A1* | 3/2009 | Funayama et al. .... G11B 5/314 360/319 |
| 2009/0310244 A1 | 12/2009 | Shimazawa et al. |
| 2013/0250456 A1 | 9/2013 | Yamada et al. |
| 2014/0133048 A1 | 5/2014 | Shiimoto et al. |
| 2014/0139952 A1 | 5/2014 | Takeo et al. |
| 2014/0177100 A1 | 6/2014 | Sugiyama et al. |
| 2015/0043106 A1* | 2/2015 | Yamada et al. ...... G11B 5/1278 360/123.05 |
| 2016/0027455 A1 | 1/2016 | Kudo et al. |
| 2016/0148627 A1 | 5/2016 | Nagasaka et al. |
| 2017/0236537 A1 | 8/2017 | Murakami et al. |
| 2018/0268848 A1 | 9/2018 | Narita et al. |
| 2019/0088274 A1 | 3/2019 | Narita et al. |

OTHER PUBLICATIONS

International Search Report and the Written Opinion for International Application No. PCT/US2018/052711 dated Jan. 22, 2019, 14 pages.

Mallory, Mike et al; "Head and Media Challenges for 3 Tb/in2 Microwave-Assisted Magnetic Recording"; IEEE Transactions on Magnetics, vol. 50, No. 7, Jul. 2014 (8 pages).

* cited by examiner

SPIN TORQUE LAYER IN SIDE GAP FOR IMPROVED FIELD AND CROSS TRACK FIELD GRADIENT

CROSS-REFERENCE TO RELATED APPLICATIONS

This application is a continuation of co-pending U.S. patent application Ser. No. 16/017,896, filed Jun. 25, 2018, which claims benefit of U.S. Provisional Application 62/570,030 dated Oct. 9, 2017. Each of the aforementioned related patent applications is herein incorporated by reference.

BACKGROUND OF THE DISCLOSURE

Field of the Disclosure

Aspects of the disclosure relate to storage devices for computer systems. More specifically, aspects of the disclosure relate to methods and apparatus to increase storage capacity per unit area of memory systems.

Description of the Related Art

Conventional perpendicular magnetic recording devices (PMR) are reaching fundamental limits regarding field and cross track field gradients. Magnetic recording and reproduction arrangements record and read information through a magnetization direction of a disk or other medium. Reading such magnetization on a disk with a head configured for such activities results in a variety of voltages on the head as the magnetization on the disk increases and decreases. The magnetization head is designed to be operated near the disk, for example at a fixed distance. To reproduce information more efficiently, it is desired to decrease the width of the magnetic tracks which the head may read. Decreasing the width of the tracks increases the amount of data that may be stored on a per area basis.

Conventional magnetic recording devices include structures knowns as "shields" at the exterior most portions of their respective heads. These shields prevent excess magnetic flux from entering areas of a medium that are not being read, therefore preventing inadvertent magnetization and creation of inaccurate data. The shields are usually created from soft magnetic materials that absorb magnetic flux.

Field gradient is an important parameter for magnetic head operation. In some conventional embodiments cross-track gradients (across the face of the media) are manipulated by changing shield materials. In other embodiments, the side gap distance from a main pole may be altered.

Conventional apparatus and methods that alter the side gap distance from a main pole, however, are prone to leaks of magnetic flux from the main pole into the side shield. Such leaks can adversely affect the operation of the magnetic head.

There is a need to increase memory system performance as well as the interaction between the memory system and a host system.

There is a further need to provide a memory system and method of writing to a memory system that improves the amount of data storage on media.

There is further need to provide a memory system and method of writing to a memory system that provides for improved field and cross track field gradient.

There is a still further need to provide a magnetic head system that minimizes errors while reading and writing from inadvertent flux from reduced side gap distances.

SUMMARY OF THE DISCLOSURE

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

In a first embodiment, a magnetic recording head is disclosed having a main pole, a shield hot seed layer positioned at a first side of the main pole, a first material positioned at both a second side and a third side of the main pole, the first material connected to the main pole, a second material positioned adjacent to the first material on the second side and the third side of the main pole, the second material comprised of a spin torque layer, a third material positioned adjacent to the second material on the second side and the third side of the main pole, a fourth material positioned adjacent to the third material on the second side and the third side of the main pole and a side shield connected on an exterior side of the fourth material.

In a second embodiment, a magnetic recording head is disclosed having a main pole, a shield hot seed layer positioned at a first side of the main pole; a first material positioned at a second side of the main pole, the first material connected to the main pole, a second material positioned adjacent to the first material on the second side of the main pole, the second material comprised of a spin torque layer, a third material positioned adjacent to the second material on the second side of the main pole, a fourth material positioned adjacent to the third material on the second side of the main pole and a side shield connected on an exterior side of the fourth material.

In another example embodiment, a magnetic recording head is disclosed, comprising a main pole, a shield hot seed layer positioned at a first side of the main pole, a first material positioned at both a second side and a third side of the main pole, the first material connected to the main pole, a second material positioned adjacent to the first material on the second side and the third side of the main pole, a third material positioned adjacent to the second material on the second side and the third side of the main pole, a fourth material position adjacent to the third material on the second side and the third side of the main pole, a spin torque layer positioned at the first side of the main pole between the main pole and the shield hot seed layer and a side shield connected on an exterior side of the third material.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage. In the embodiments described, a data storage arrangement is connected to a host system. The function of the data storage arrangement is to accept data and store the data until needed again by a user or the host. The data storage arrangement may have to accept large bursts of data at a rapid pace, depending on the computer process performed, therefore the data storage arrangement is configured with multiple memory units that provide for various states of usage. The data storage arrangements may have magnetic head arrangements that aid in the reading of certain media. Sections of the data storage arrangement are configured of memory systems that provide for fast action (low latency) so that computer processes may be conducted at a rapid pace. Such low latency action may be accomplished by magnetic disk configurations. The data storage arrangement may have an interface that allows the data storage arrangement to connect with the host. The interface may be a SATA compatible interface, as a non-limiting embodiment. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection.

Auxiliary connections may be provided to the data storage arrangement to allow for addition options for inputting data directly to the data storage arrangement without interfacing with a host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

A controller is provided to control actions of the data storage arrangement as required by the host. The controller may also be configured to perform maintenance activities for the data storage arrangement to allow for efficient use.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, stereo audio system. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

The internal software may also be capable of providing diagnostic support for users. In such configurations, two different modes may be provided. A quick test software program may be provided with the capability to check the data storage arrangement for major performance problems. A full test mode may also be provided to provide detailed status information to a user. Such status information may be, for example, total amount of memory of the data storage arrangement, the amount of memory storage used, storage divisions provided on the data storage arrangement, firmware versions for the internal software, memory block errors and similar data. The internal software may also have the capability of accepting data to update the firmware of the internal software.

The internal software may also be used as a server system wherein in certain embodiments, DLNA enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secured log in or an anonymous login capability.

In specific embodiments, the data storage arrangement may be configured such that the system interacts with other storage systems, such as cloud storage systems. In the event that the data storage arrangement approaches the limits of storage capability, the data storage arrangement may allow for some of the data to be stored on cloud based systems. Selection of the data to be stored on such external storage systems may be governed by the controller which is configured to determine what sections of data may be appropriately stored in cloud based systems to minimize latency for users. The storage system may have a unique identifier MAC address and device name to allow the system to operate on an independent basis. The storage system may also be operated in a configuration that allows for the system to clone a MAC address of a computer that is attached.

The overall capacity of the data storage arrangement may be vary according to the different embodiments provided. Capacities 1 TB, 2 TB up to 12 TB may be provided, as non-limiting embodiments. Different form factors may also be provided. In the illustrated embodiment, a form factor of 3.5 inches is provided. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OSA 10.7), Mountain Lion (Mac OS 10.8), Yosemite (Mac OS 10.10), El Capitan (Mac OS 10.11), Sierra and Mavericks as non-limiting embodiments. Supported browsers for the storage system may be, in non-limiting embodiments, Internet Explorer, Safari, Firebox and Google Chrome.

Software may also be included in the system to allow for quick and automatic backups of data according to user prescribed requirements. Such backup ability may be compliant with Windows based backup and restore functions and/or Apple Time Machine requirements. Furthermore, software may be provided to add more than one user to the storage system. Users can be added or deleted according to an administration account. Such administration account may also allow for restricted access for certain users according to administration requirements.

Figure 1:
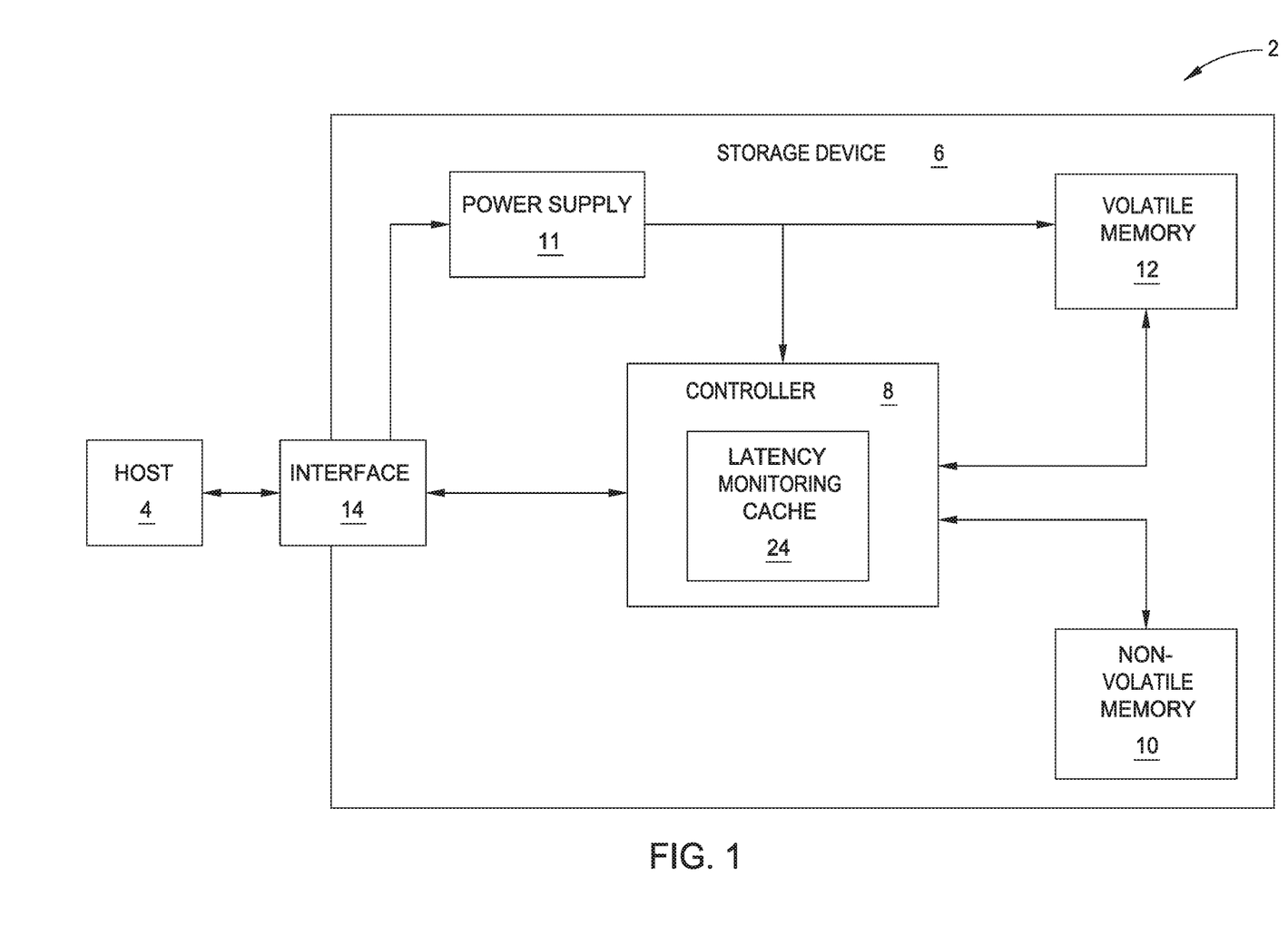
FIG. 1 is a diagram of an example host-storage configuration.

FIG. 1 is a conceptual and schematic block diagram illustrating an example storage environment 2 in which storage device 6 may function as a storage device for host device 4 in accordance with one or more techniques of this disclosure. For instance, host device 4 may utilize non-volatile memory devices included in storage device 6 to storage and retrieve data. In some examples, storage environment 2 may include a plurality of storage devices such as storage device 6, which may operate as a storage array. For instance, storage environment 2 may include a plurality of storage devices 6 configured as a redundant array of inexpensive/independent disks (RAID) that collectively function as a mass storage device for host device 4.

Storage environment 2 may include host device 4 which may store and/or retrieve data to and/or from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e. laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1, storage device 6 may include controller 8, non-volatile memory 10 (NVM), power supply 11, volatile memory 12 and interface 14. In some examples, storage device 6 may include additional components not shown in FIG. 1 for sake of clarity. For example, storage device 6 may include a printed board (PB) to which components of storage device 6 are mechanically attached and which includes electrically conductive traces that electrically interconnect components of storage device 6, or the like. In some examples, the physical dimensions and connector configurations of storage device 6 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCT Express (PCIe) (e.g. PCIe x1, x4, x8, x16, PCIe Mini Card, MiniPCI, etc.). In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with one or more of the following protocols: advanced technology attachment (ATA) (e.g. serial-ATA (SATA) and parallel-ATA (PATA)), Fiber Channel Protocol (FCP), small computer system interface (SCSI), serially attached SCSI (SAS), PCI, and PCIe, non-volatile memory express (NVMe), or the like. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4. For example, as illustrated in FIG. 1, power supply 11 may receive power from host device 4 via interface 14.

Storage device 6 may include NVM 10, which may include a plurality of memory devices. NVM 10 may be configured to store and/or retrieve data. For instance, a memory device of NVM 10 may receive data and a message from controller 8 that instructs the memory device to store the data. Similarly, the memory device of NVM 10 may receive a message from controller 8 that instructs the memory device to retrieve data. In some examples, each of the memory devices may be referred to as a die. In some examples, a single physical chip may include a plurality of dies (i.e., a plurality of memory devices). In some examples, each memory device may be configured to store relatively large amounts of data (e.g., 128 MB, 256 MB, 512 MB, 1 GB, 2 GB, 4 GB, 8 GB, 16 GB, 32 GB, 64 GB, etc.)

The storage device may include a power supply 11, which may provide power to one or more components of storage device 6. When operating in a standard mode, power supply 11 may provide power to the one or more components using power provided by an external device, such as host device 4. For instance, power supply 11 may be configured to provide power to at least one component using power received from the host device 4. The power may be received via an interface 14 or may be received through a separate connection. Power may also be stored or supplied by power storage components, such as capacitors, super capacitors or batteries.

The storage device 6 may include a volatile memory 12 that may be used by the controller 8 to store information. In some examples, controller 8 may use volatile memory 12 as a cache. In a non-limiting embodiment, controller 8 may store cached information in volatile memory 12 until cached information is written to non-volatile memory 10. As provided in FIG. 1, the volatile memory 12 receives power from the power supply 11. Non-limiting examples of volatile memory 12 may include random-access memory (RAM), dynamic random access memory (DRAM), static RAM (SRAM) and synchronous dynamic RAM.

The controller 8 of the storage device 6 may be configured to manage at least one operation of the storage device 6. For instance, controller 8 may manage the reading of data from and/or the writing of data to non-volatile memory 10.

In some examples, controller 8 may measure latency in storage device 6 and record latency information about storage device 6. For example, if storage device 6 receives a read command from host device 4, controller 8 may initiate a data retrieval command to retrieve data from non-volatile memory 10 and monitor the process of data retrieval. In non-limiting examples, the controller 8 may be configured to determine a time indicative of initiating data retrieval command. For example, controller 8 may determine a time indicative of initiating the data retrieval command by determining a time when controller 8 received the read command from host device 4, began to execute the data retrieval command, or received a first data frame from non-volatile memory 10. In some examples, controller 8 may determine a time indicative of terminating the data retrieval command by determining a time when controller 8 received a last data frame from non-volatile memory 10 or sent a status frame (e.g. a frame indicating whether the data transfer was successful) to host device 4.

If the storage device 6 receives a write command from host device 4, controller 8 may initiate a data storage command to store data to non-volatile memory 10 and monitor the progress of the data storage command. In some examples, controller 8 may determine a time indicative of initiating the data storage command by determining a time when controller 8 received the write command from host device 4, began to execute the data storage command, or received a first data frame from host device 4. In some examples, controller 8 may determine a time indicative of terminating the data storage command. For example, controller 8 may determine a time indicative of terminating the data storage command by determining a time when controller 8 received a last data frame from host device 4, or sent a status frame (e.g. a frame indicating whether the data transfer was successful) to host device 4.

Controller 8 may store timestamp information associated with the data retrieval command (or data storage command) in latency monitoring cache 24. For example, controller 8 may determine a timestamp associated with the time indicative of initiating the data retrieval command (or data storage command) and may cause the timestamp to be stored in latency monitoring cache 24. Likewise, controller 8 may determine a timestamp associated with the time indicative of terminating the data retrieval command (or data) storage command) and may cause the timestamp to be stored in latency monitoring cache 24. In some examples, the granularity of the timestamps stored in latency monitoring cache 24 may be configurable. For example, controller 8 may store timestamp information in increments as small as 10 nanoseconds to increments of 10 microseconds or more.

Figure 2:
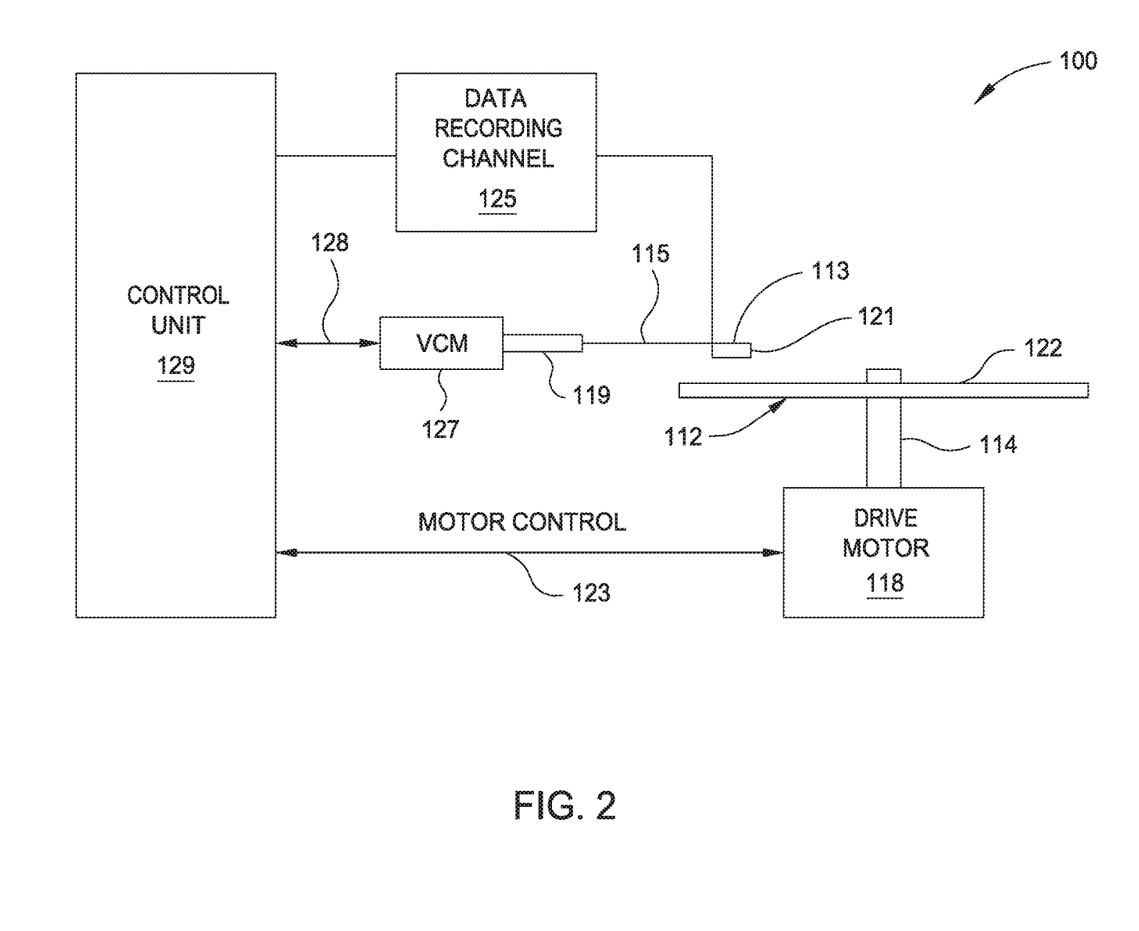
FIG. 2 is a schematic illustration of a magnetic media device according to one embodiment.

FIG. 2 is a schematic illustration of a data storage device such as a magnetic media device. Such a data storage device may be a single drive/device or comprise multiple drives/devices. For the sake of illustration, a single disk drive 100 is shown according to one embodiment. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that may include a heavy metal structure sandwiched between two magnetic structures. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128.

The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media device and the accompanying illustration of FIG. 2 are for representation purposes only. It should be apparent that magnetic media devices may contain a large number of media, or disks, and actuators, and each actuator may support a number of sliders.

Figure 3:
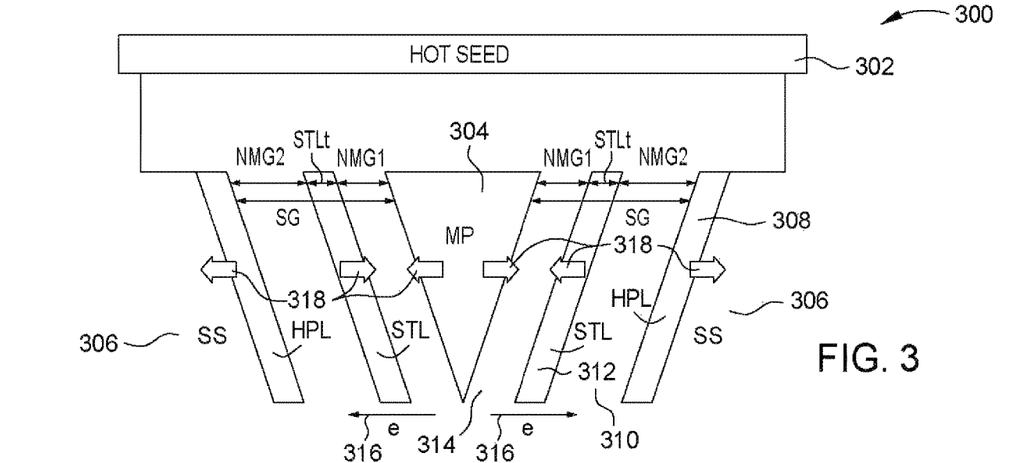
FIG. 3 is a schematic of a first embodiment of a main pole arrangement in accordance with one aspect of a described embodiment.

Referring to FIG. 3, a magnetic head 300 for writing and reading information in a data storage system is illustrated as illustrated in FIG. 2. The magnetic head 300 is configured to write data to the medium placed near the head 300. In some embodiments, the other portions of head 300 may also read data from the medium. In a non-limiting embodiment, a main pole (MP) 304 is provided. The main pole 304 is configured in a triangular relationship. Other configurations for the main pole 304 may be provided, such as a trapezoidal shape. A top gap, often called a "write gap" is provided between the main pole 304 and a hot seed 302 on a first side of the main pole 304. A material may be placed in the write gap such that functions of the main pole 304 and the hot seed 302 are not impacted. A first material layer 314 having a thickness or width labeled NMG1 is positioned next to the main pole 304 on a second and a third side of main pole 304. This first material layer 314 may contain, in a non-limiting embodiment, tantalum and/or chromium. In the illustrated embodiment, the first material layer 314 contacts the main pole 304. Further referring to FIG. 3, a second layer of material 312 having a thickness or width labeled STLt is placed next to the first layer of material 314. In this non-limiting embodiment, the material for the second layer of material 312 is a spin transfer torque layer (STL) material. Ferromagnetic materials may be used for the second layer of material 312. A third layer of material 310 having a thickness or width labeled NMG2 is placed next to the second layer of material 312. In the illustrated embodiment, the third layer of material 310 contacts the second layer of material 312. The third layer of material 310 may be configured from copper and/or silver materials, alloys and material arrangement. A fourth layer of material 308 is configured to be placed next to the third layer of material 310. The fourth layer of material 308 may be a high polarization layer (HPL) material. The distance from the main pole 304 to the fourth layer of material 308 is labeled SG. A side shield (SS) 306 is connected to the fourth layer of material 308. In the illustrated embodiment, electrons (e) 316 flow from the main pole 304 out to the shield 306, as noted by the arrow 316. Larger arrows 318 indicate the direction of magnetization during operation of the magnetic head 300.

Figure 4:
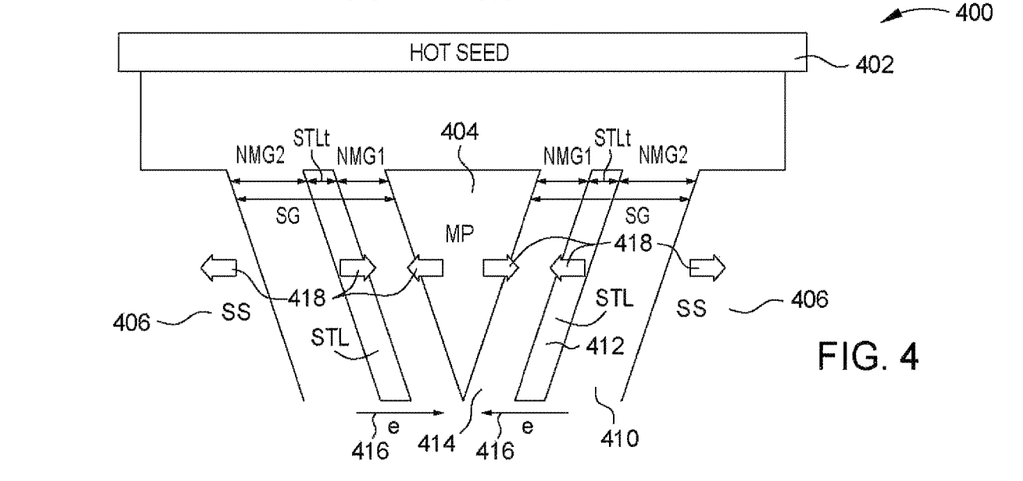
FIG. 4 is a schematic of the first embodiment of FIG. 3 with an opposite current.

Referring to FIG. 4, a magnetic head 400 for writing and reading information in a data storage system is illustrated. In a non-limiting embodiment, a main pole (MP) 404 is provided. The main pole 404 is configured in a triangular relationship. Although illustrated in a triangular relationship, other embodiments may be provided, such as a trapezoid. A top gap is provided between the main pole 404 and a hot seed 402 on a first side of the main pole 404. A material may be placed in the top gap such that the interaction of the main pole 404 and the hot seed 402 are not impacted. A first material layer 414 having a thickness or width labeled NMG1 is positioned next to the main pole 404 on a second and a third side of main pole 404. This first material layer may contain, in a non-limiting embodiment, tantalum and/or chromium. In the illustrated embodiment, the first material layer 414 contacts the main pole 404. Further referring to FIG. 4, a second layer of material 412 having a thickness or width labeled STLt is placed next to the first layer of material 414. In this non-limiting embodiment, the material for the second layer of material 412 is a spin transfer torque layer (STL) material. Ferromagnetic materials may be used for the second layer of material 412. A third layer of material 410 having a thickness or width labeled NMG2 is placed next to the second layer of material 412. In the illustrated embodiment, the third layer of material 410 contacts the second layer of material 412. The third layer of material 410 may be configured from copper and/or silver materials. In this embodiment, as compared to FIG. 3, a fourth layer of material is not used. A side shield (SS) 406 is connected to the third layer of material 410. The distance from the main pole 404 to the side shield 406 is labeled SG. In the illustrated embodiment, electrons (e) 416 flow into the main pole 404 from the shield 406, as noted by the arrow 416. Larger arrows 418 indicate the direction of magnetization during operation of the magnetic head 400.

Figure 5:
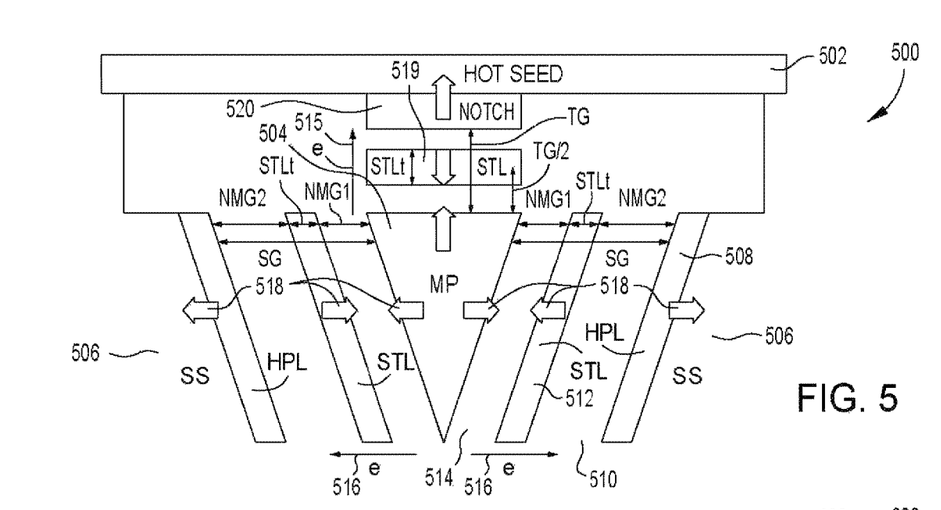
FIG. 5 is a schematic of a second embodiment of a main pole arrangement in accordance with a second aspect of a described embodiment.

Referring to FIG. 5, another example embodiment of a magnetic head 500 for writing and reading information in a data storage system is illustrated. In this non-limiting embodiment, a main pole (MP) 504 is provided. The main pole 504 is configured in a triangular relationship, which should not be considered limiting. A top gap is provided between a first side of the main pole 504 and a spin torque layer (STL) 519 with a gap and notch layer 520 connected to a hot seed 502. The distance from the first side of the main pole 504 to the notch layer 520 is labeled TG, and half the distance from the main pole 504 to the notch layer 520 is labeled TG/2. Materials used for the top gap may be any such materials that do not impact the functions of the main pole 504. Materials used for the spin torque layer 519 may be, for example, ferromagnetic materials. The thickness of the spin torque layer 519, labeled STLt, may be, in one non-limiting embodiment, 10 nm. The spin torque layer 519 may be centered on the first side of the main pole 504. A first material layer 514 having a thickness or width labeled NMG1 is positioned next to the main pole 504 on a second and a third side of main pole 504. This first material layer may contain, in a non-limiting embodiment, tantalum and/or chromium. In the illustrated embodiment, the first material layer 514 contacts the main pole 504. Further referring to FIG. 5, a second layer of material 512 having a thickness or width labeled STLt is placed next to the first layer of material 514. In this non-limiting embodiment, the material for the second layer of material 512 is a spin transfer torque layer (STL) material. Ferromagnetic materials may be used for the second layer of material. A third layer of material 510 having a thickness or width labeled NMG2 is placed next to the second layer of material 512. In the illustrated embodiment, the third layer of material 510 contacts the second layer of material 512. The third layer of material 510 may be configured from copper and/or silver materials. A fourth layer of material 508 is configured to be placed next to the third layer of material 510. The fourth layer of material 508 may be a high polarization layer (HPL) material. The distance from the main pole 504 to the fourth layer of material 508 is labeled SG. A side shield (SS) 506 is connected to the fourth layer of material 508. In the illustrated embodiment, electrons (e) 516 flow from the main pole 504 out to the shield 506, as noted by the arrow 516. Electrons (e) 515 also flow from the main pole 504 through the spin torque layer 519 to the notch layer 520. Larger arrows 518 indicate the direction of magnetization during operation of the magnetic head 500. As illustrated, the top gap side and side gap side spin torque layer are in an "on" condition (i.e. switched against gap fields.) In the illustrated embodiment, the second layer of material 512 may have a thickness between 2 nm to 10 nm. The first layer of material 514 has a thickness between 5 nm to 20 nm. The entire side gap length (from the surface of the main pole 504 to a surface of the fourth layer of material 508) may be 20 to 30 nm.

Figure 6:
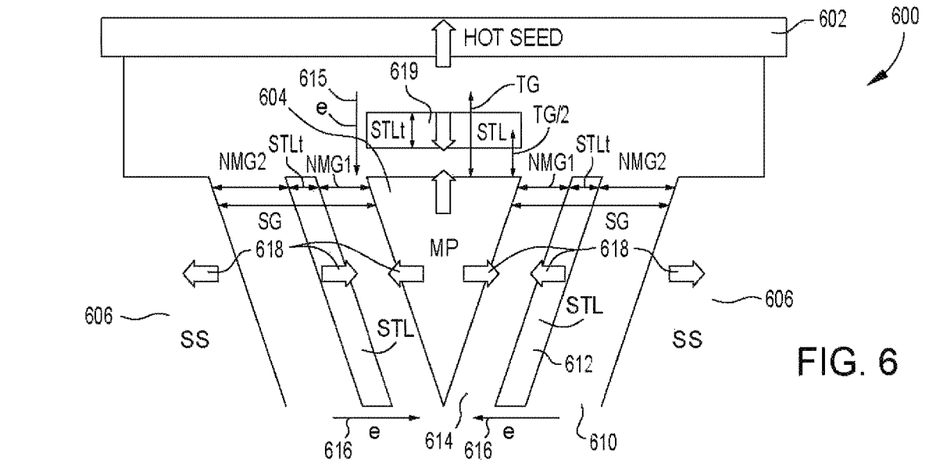
FIG. 6 is a schematic of FIG. 5 wherein electron flow proceeds from the side shields to the main pole.

Referring to FIG. 6, another example embodiment of a magnetic head 600 for writing and reading information in a data storage system is illustrated. In this non-limiting embodiment, a main pole (MP) 604 is provided. The main pole 604 is configured in a triangular relationship. A top gap is provided between a first side of the main pole 604 and a spin torque layer 619 with two gaps (labeled TG and TG/2) and a hot seed 602. The materials for the top gap may be any material that does not adversely impact the functions of the main pole 604. Ferromagnetic materials may be used for the spin torque layer (STL) 618 which has a thickness or width labeled STLt. As compared to FIG. 5, the magnetic head 600 lacks a notch area. A first material layer 614 having a thickness or width labeled NMG1 is positioned next to the main pole 604 on a second and a third side of main pole 604. This first material layer may contain, in a non-limiting embodiment, tantalum and/or chromium. In the illustrated embodiment, the first material layer 614 contacts the main pole 604. Further referring to FIG. 6, a second layer of material 612 having a thickness or width labeled STLt is placed next to the first layer of material 614. In this non-limiting embodiment, the material for the second layer of material 612 is a spin transfer torque layer (STL) material, which may be a ferromagnetic material. A third layer of material 610 is placed next to the second layer of material 612. In the illustrated embodiment, the third layer of material 610 having a thickness or width labeled NMG2 contacts the second layer of material 612. The third layer of material 610 may be configured from copper and/or silver materials. A side shield (SS) 606 is connected to the third layer of material 610. In the illustrated embodiment, electrons (e) 616 flow to the main pole 604 from the shield 606, as noted by the arrow 616. Electrons (e) 615 also flow from spin torque layer 619 to the main pole 604. Larger arrows 618 indicate the direction of magnetization during operation of the magnetic head 600. As illustrated, the top gap side and side gap side spin torque layer are in an "on" condition (i.e. switched against gap fields.) In the illustrated embodiment, the second layer of material 612 may have a thickness between 2 nm to 10 nm. The first layer of material 614 has a thickness NMG1 between 5 nm to 20 nm. The entire side gap length (SG) (from the surface of the main pole 604 to a surface of the fourth layer of material 608) may be 20 to 30 nm. In this embodiment, an additional layer of a high polarization material may be added, similar to FIG. 5.

Figure 7A:
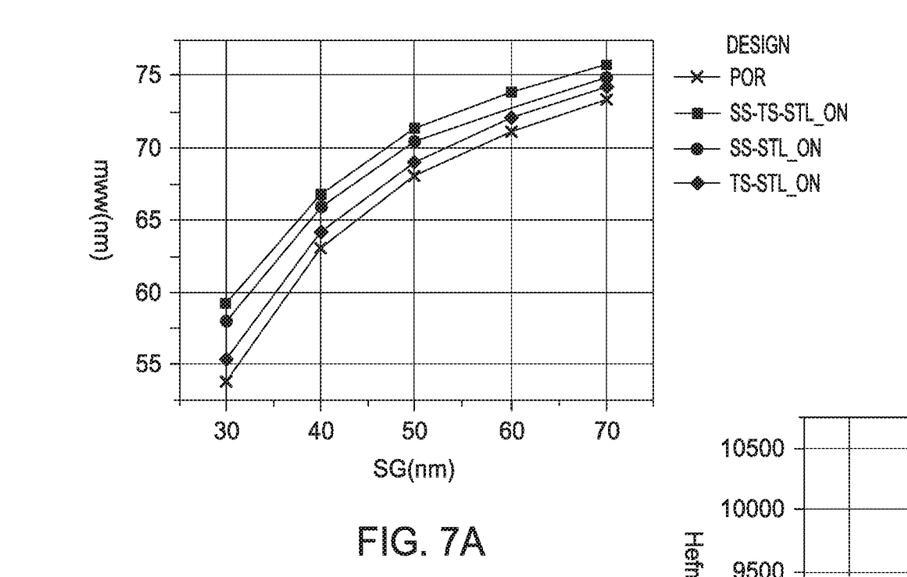
FIGS. 7A, 7B, 7C and 7D are graphs of various functional parameters per side gap length for a control arrangement and three different magnetic head configurations.
Figure 7B:
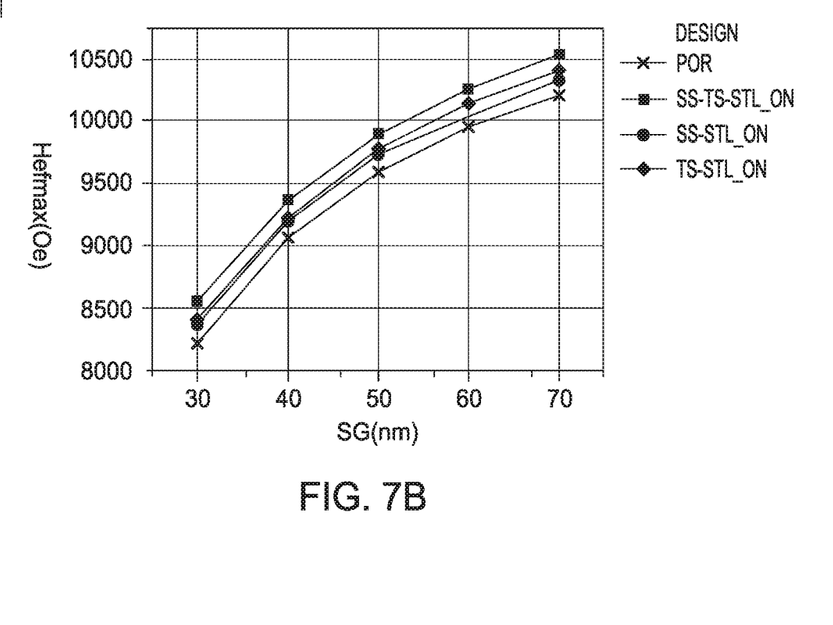
Figures 7C, 7D:
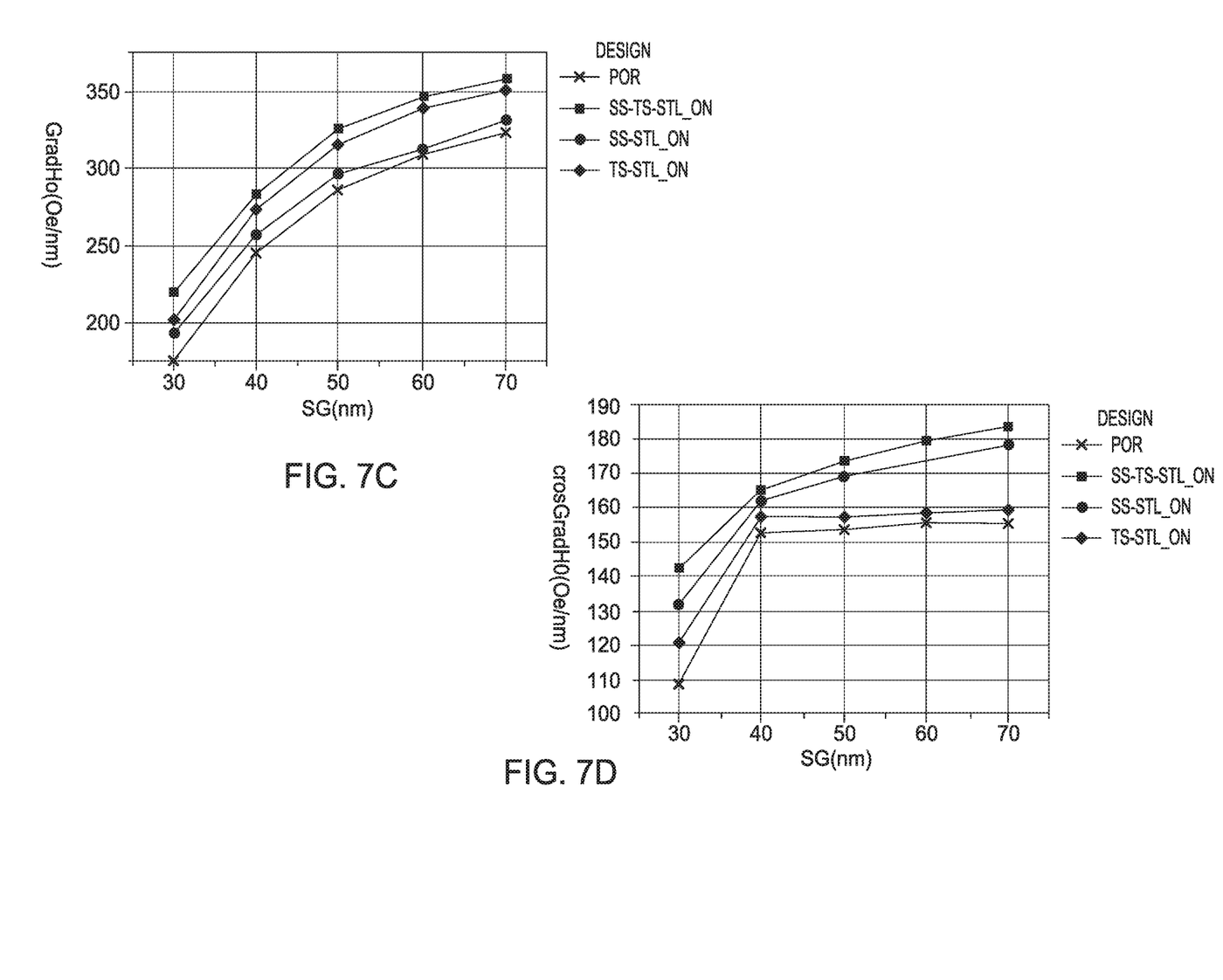

In the graphs of FIGS. 7A, 7B, 7C and 7D, a control case POR is provided as well as three other configurations. The POR case has no spin transfer layer on the sides and only the hot seed activated at the top gap in order to see the contribution of the addition of the spin transfer layers added. SS-TS STL_ON indicates embodiments where spin transfer torque levels are placed on the sides and top. SS-STL_ON indicates embodiments where spin transfer torque levels on the side are placed in an on arrangement. TS-STL_ON indicates embodiments where the spin transfer torque levels on the top are placed in the on arrangement. FIG. 7C and FIG. 7D are graphs showing the effects on magnetic gradient (GradHo) in Oe/nm over side distance (SG) in nm, where FIG. 7D shows a cross magnetic gradient (crossGradHo). FIG. 7A is a graph showing magnetic write width (mww) in nm over side distance in nm. FIG. 7B is a graph showing an effective field (Hefmax) in Oe over side distance in nm. As can be seen in the graphs, the addition of the spin transfer layer materials provides significant advantages over conventional arrangements.

Figure 8:
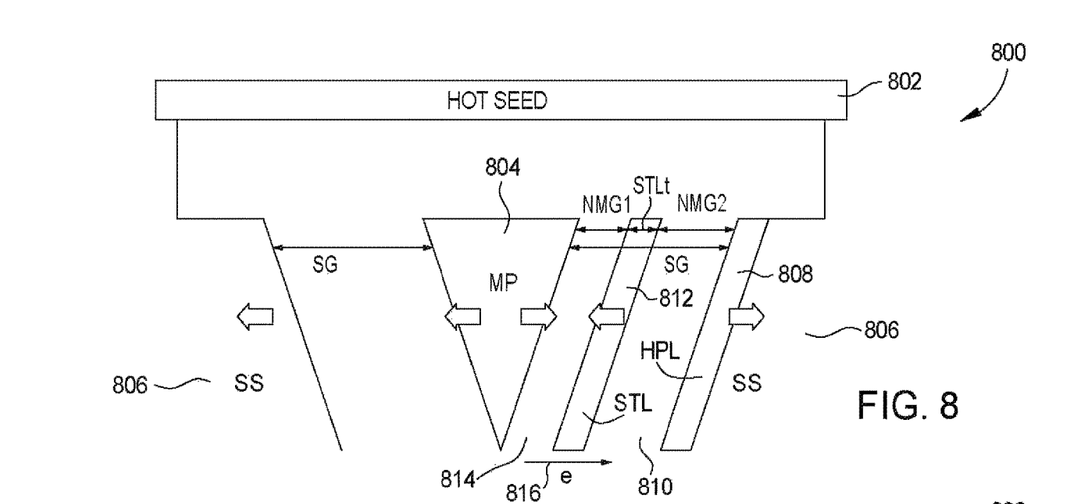
FIG. 8 is a schematic of a shingled arrangement for a main pole arrangement in accordance with another example embodiment described.

Referring to FIG. 8, an arrangement for a magnetic disk head 800 is illustrated. In this embodiment, a shingled arrangement is provided. A main pole (MP) 804 is positioned below a hot seed 802 on a first side of the main pole 804. A gap is provided between the main pole 804 and the hot seed 802 that may consist of a material that allows for interaction of the hot seed 802 and the remainder of the components of the head 800. A first layer of material 814 having a thickness or width labeled NMG1 is positioned contacting the main pole 804 on a second side of the main pole 804. A second layer of material 812 having a thickness or width labeled STLt is positioned on the first layer of material 814 in the direction of the second side of the main pole 804. The materials provided in the second layer of material 812 are spin transfer torque layer (STL) materials, which may be ferromagnetic materials. A third layer of material 810 having a thickness or width labeled NMG2 is positioned contacting the second layer of material 812. A fourth layer of material 808 is positioned contacting the third layer of material 810. In the illustrated embodiment, the fourth layer of material 808 is a high polarization layer (HPL). A shield layer (SS) 806 is also provided contacting the fourth layer of material 808. The distance from the main pole 804 to the fourth layer of material 808 is labeled SG. Electron (e) flow 816 is illustrated as extending from the main pole 804 towards the shield 806.

Figure 9:
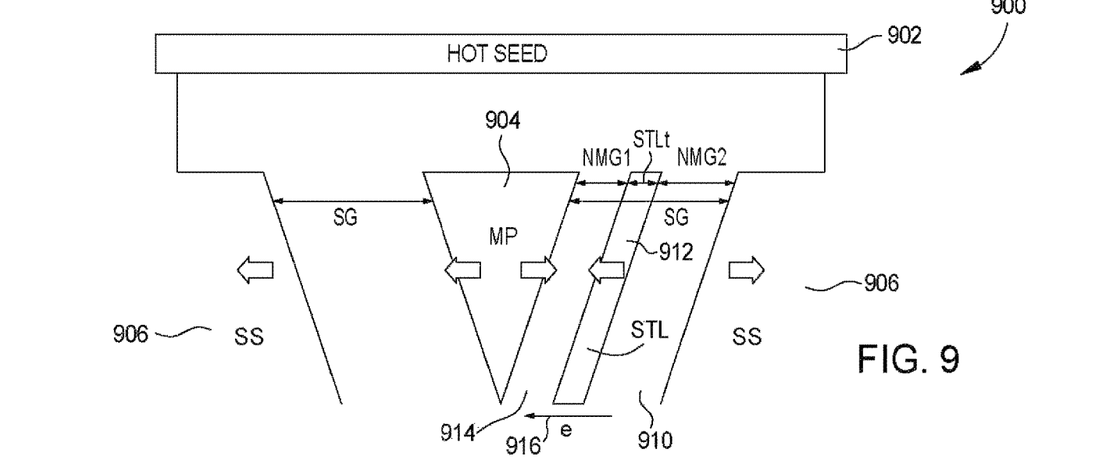
FIG. 9 is a schematic of a shingled arrangement for a main pole arrangement of FIG. 8 with electron flow from the side shield to the main pole.

Referring to FIG. 9, an arrangement for a magnetic disk head 900 is illustrated. In this embodiment, a shingled arrangement is provided. A main pole (MP) 904 is positioned below a hot seed 902 on a first side of the main pole 904. A gap is provided between the main pole 904 and the hot seed 902. The gap may be any material that allows the interaction of the main pole 904 and the hot seed 902. A first layer of material 914 having a thickness or width labeled NMG1 is positioned contacting the main pole 904 on a second side of the main pole 904. A second layer of material 912 having a thickness or width labeled STLt is positioned on the first layer of material 914 in the direction of the second side of the main pole 904. The materials provided in the second layer of material 912 are spin transfer torque layer (STL) materials. In non-limiting embodiments, ferromagnetic materials may be used. A third layer of material 910 having a thickness or width labeled NMG2 is positioned contacting the second layer of material 912. A shield layer (SS) 906 is also provided contacting the third layer of material 910. The distance from the main pole 904 to the shield layer 906 is labeled SG. Electron (e) flow 916 is illustrated as extending from the shield 906 toward the main pole 904.

In the embodiments provided, the addition of a spin torque layer assists in the cross-track gradient over conventional methods and arrangements. The boost in the gradient readings for the embodiments provided do not come from a change in a field angle due to flux leakage into side shields. The spin torque layer provides additional in-plane magnetic field components (in the cross-track direction), that are superimposed on top of the writer field, improving gradient.

In a first example embodiment, a magnetic recording head is disclosed comprising a main pole, a shield hot seed layer positioned at a first side of the main pole, a first material positioned at both a second side and a third side of the main pole, the first material connected to the main pole, a second material positioned adjacent to the first material on the second side and the third side of the main pole, the second material comprised of a spin torque layer, a third material positioned adjacent to the second material on the second side and the third side of the main pole, a fourth material positioned adjacent to the third material on the second side and the third side of the main pole and a side shield connected on an exterior side of the fourth material.

In another example embodiment, a magnetic recording head is disclosed wherein the first material is a material that contains tantalum.

In another example embodiment, a magnetic recording head is disclosed wherein the third material contains copper.

In another example embodiment, a magnetic recording head is disclosed wherein the third material additionally contains silver.

In another example embodiment, a magnetic recording head is disclosed wherein the fourth material is a high polarization layer.

In another example embodiment, a magnetic recording head is disclosed wherein the high polarization layer comprises CoFe.

In another example embodiment, a magnetic recording head is disclosed wherein the high polarization layer is magnetically coupled to the main pole.

In another non-limiting embodiment, the magnetic recording head may be provided wherein the high polarization layer is magnetically coupled to a side shield.

In another non-limiting embodiment, the magnetic recording head may be provided further comprising a spin torque transfer layer positioned on the first side of the main pole between the first side of the main pole and the hot seed layer.

In another non-limiting embodiment, the magnetic recording head may further comprise a notch layer positioned between the spin torque transfer layer positioned on the first side of the main pole and the hot seed layer.

In another non-limiting embodiment, the magnetic recording head may be provided wherein the notch layer is positioned contacting the hot seed layer.

In another non-limiting embodiment, a magnetic recording head may be provided comprising a main pole, a shield hot seed layer positioned at a first side of the main pole, a first material positioned at a second side of the main pole, the first material connected to the main pole, a second material positioned adjacent to the first material on the second side of the main pole, the second material comprised of a spin torque layer, a third material positioned adjacent to the second material on the second side of the main pole, a fourth material positioned adjacent to the third material on the second side of the main pole and a side shield connected on an exterior side of the fourth material.

In another non-limiting embodiment, the magnetic recording head may be provided wherein the fourth material is a high polarization layer.

In another non-limiting embodiment, the magnetic recording head may be provided wherein the high polarization layer is magnetically coupled to the main pole.

In another non-limiting embodiment, the magnetic recording head may be provided wherein the high polarization layer is magnetically coupled to a side shield.

In another non-limiting embodiment, a magnetic recording head is disclosed comprising a main pole, a shield hot seed layer positioned at a first side of the main pole, a first material positioned at both a second side and a third side of the main pole, the first material connected to the main pole, a second material positioned adjacent to the first material on the second side and the third side of the main pole, the second material comprised of a spin torque layer a third material positioned adjacent to the second material on the second side and the third side of the main pole and a side shield connected on an exterior side of the third material.

In another non-limiting embodiment, the magnetic recording head may be configured wherein the main pole is triangular shaped.

In another non-limiting embodiment, the magnetic recording head may be configured wherein the second material is a ferromagnetic material.

In another non-limiting embodiment, the magnetic recording head may be configured wherein the third layer is made from copper.

In another non-limiting example, a magnetic recording head is disclosed wherein the third layer is made from silver.

In another non-limiting embodiment, a magnetic recording head is disclosed, comprising a main pole, a shield hot seed layer positioned at a first side of the main pole, a first material positioned at both a second side and a third side of the main pole, the first material connected to the main pole, a second material positioned adjacent to the first material on the second side and the third side of the main pole, a third material positioned adjacent to the second material on the second side and the third side of the main pole, a fourth material position adjacent to the third material on the second side and the third side of the main pole, a spin torque layer positioned at the first side of the main pole between the main pole and the shield hot seed layer and a side shield connected on an exterior side of the third material.

In another non-limiting embodiment, the magnetic recording head may be configured wherein the spin torque layer is positioned in a gap layer between the hot seed layer and the main pole.

In another non-limiting embodiment, the magnetic recording head may be configured wherein the main pole is triangular in shape.

In another non-limiting embodiment, the magnetic recording head may further comprise notch layer connected to the hot seed layer, the notch layer positioned between the hot seed layer and the main pole.

In another example embodiment, the magnetic recording head may be configured wherein the second material is a ferromagnetic material.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A magnetic recording head, comprising:
   a main pole;
   a shield hot seed layer positioned at a first side of the main pole;
   a first material having a first thickness positioned at a second side of the main pole, the first material connected to the main pole;
   a second material having a second thickness positioned adjacent to the first material on the second side of the main pole, the second material comprised of a spin torque layer, wherein the first thickness of the first material is greater than the second thickness of the second material;

a third material having a third thickness positioned adjacent to the second material on the second side of the main pole, wherein the third thickness of the third material is greater than the first thickness of the first material;
a fourth material positioned adjacent to the third material on the second side of the main pole; and
a side shield connected on an exterior side of the fourth material.

2. The magnetic recording head according to claim 1, wherein the fourth material is a high polarization layer.

3. The magnetic recording head according to claim 2, wherein the high polarization layer is magnetically coupled to the main pole.

4. The magnetic recording head according to claim 2, wherein the high polarization layer is magnetically coupled to the side shield.

5. A magnetic recording head, comprising:
a main pole;
a shield hot seed layer positioned at a first side of the main pole;
a first material having a first thickness positioned at both a second side and a third side of the main pole, the first material connected to the main pole;
a second material having a second thickness positioned adjacent to the first material on the second side and the third side of the main pole, the second material comprised of a spin torque layer, wherein the first thickness of the first material is greater than the second thickness of the second material;
a third material having a third thickness positioned adjacent to the second material on the second side and the third side of the main pole, wherein the third thickness of the third material is greater than the first thickness of the first material;
a fourth material positioned adjacent to the third material on the second side and the third side of the main pole; and
a side shield connected on an exterior side of the fourth material.

6. The magnetic recording head according to claim 5, wherein the first material is a material that contains tantalum.

7. The magnetic recording head according to claim 5, wherein the third material contains copper.

8. The magnetic recording head according to claim 7, wherein the third material additionally contains silver.

9. The magnetic recording head according to claim 5, wherein the fourth material is a high polarization layer.

10. The magnetic recording head according to claim 9, wherein the high polarization layer comprises CoFe.

11. The magnetic recording head according to claim 10, wherein the high polarization layer is magnetically coupled to the main pole.

12. The magnetic recording head according to claim 9, wherein the high polarization layer is magnetically coupled to the side shield.

13. The magnetic recording head according to claim 5, further comprising a spin torque transfer layer positioned on the first side of the main pole between the first side of the main pole and the hot seed layer.

14. The magnetic recording head according to claim 5, further comprising: a notch layer positioned between a spin torque transfer layer positioned on the first side of the main pole and the hot seed layer.

15. The magnetic recording head according to claim 14, wherein the notch layer is positioned contacting the hot seed layer.

16. A magnetic recording head, comprising:
a main pole;
a shield hot seed layer positioned at a first side of the main pole;
a first material having a first thickness positioned at both a second side and a third side of the main pole, the first material connected to the main pole;
a second material having a second thickness positioned adjacent to the first material on the second side and the third side of the main pole, wherein the first thickness of the first material is greater than the second thickness of the second material;
a third material having a third thickness positioned adjacent to the second material on the second side and the third side of the main pole, wherein the third thickness of the third material is greater than the first thickness of the first material;
a fourth material position adjacent to the third material on the second side and the third side of the main pole;
a spin torque layer positioned at the first side of the main pole between the main pole and the shield hot seed layer; and
a side shield connected on an exterior side of the fourth material.

17. The magnetic recording head according to claim 16, wherein the spin torque layer is positioned in a gap layer between the hot seed layer and the main pole.

18. The magnetic recording head according to claim 16, wherein the main pole is triangular in shape.

19. The magnetic recording head according to claim 16, further comprising: a notch layer connected to the hot seed layer, the notch layer positioned between the hot seed layer and the main pole.

20. The magnetic recording head according to claim 16, wherein the second material is a ferromagnetic material.

* * * * *